H. D. WEED.
GRIP TREAD FOR VEHICLE TIRES.
APPLICATION FILED MAR. 13, 1906.
1,141,735.
Patented June 1, 1915.
3 SHEETS—SHEET 1.
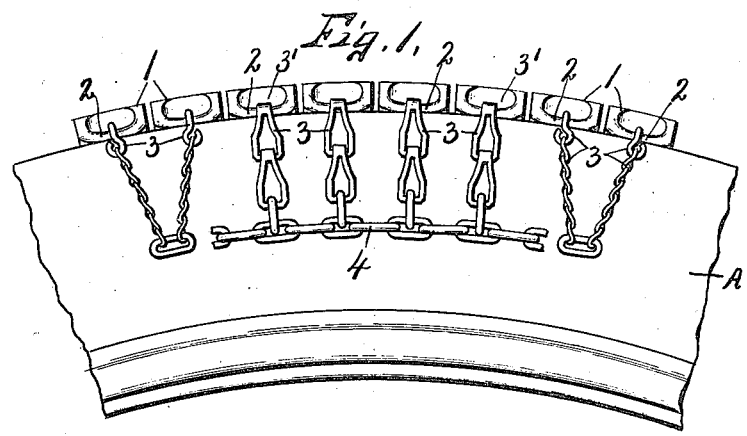
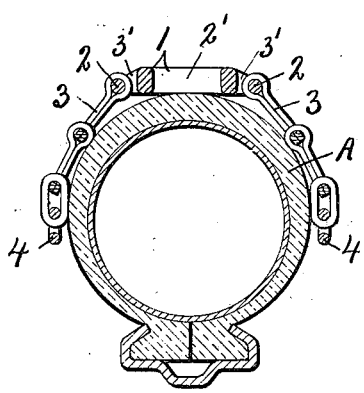
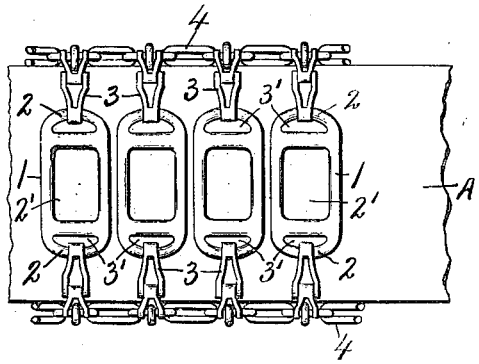
Witnesses:
Inventor:
H. D. Weed.
By
Howard P. Denison
Attorney.

H. D. WEED.
GRIP TREAD FOR VEHICLE TIRES.
APPLICATION FILED MAR. 13, 1906.
1,141,735.
Patented June 1, 1915.
3 SHEETS—SHEET 2.
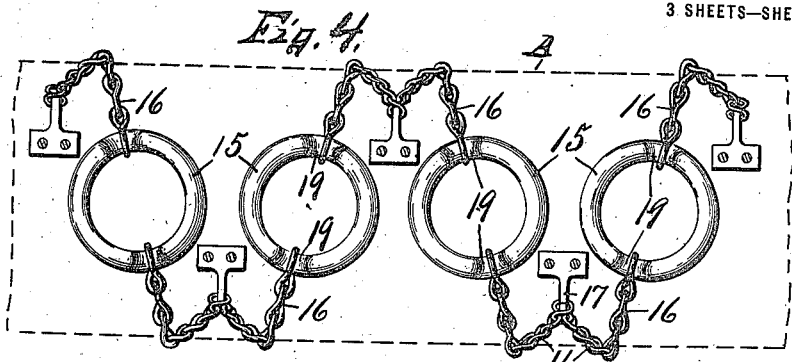
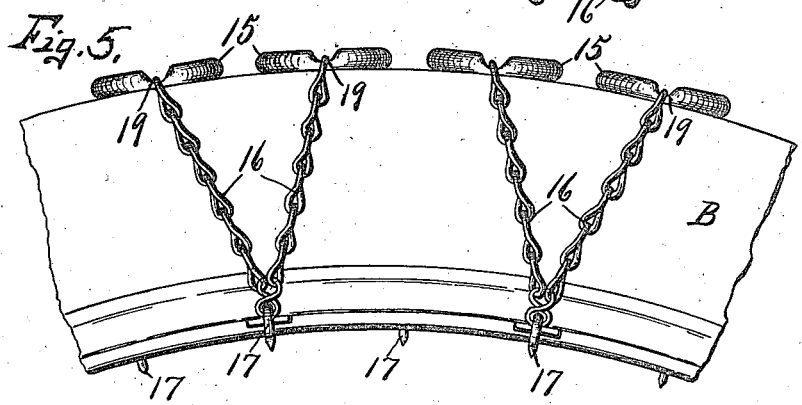
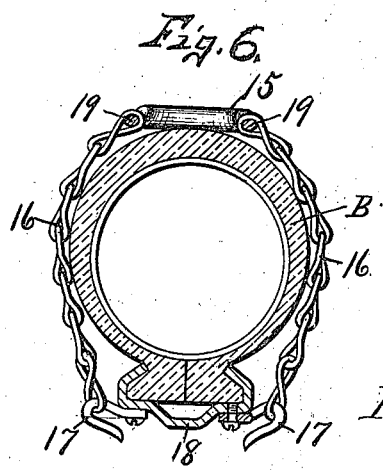
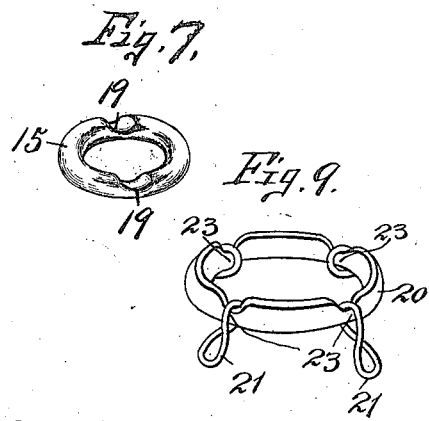
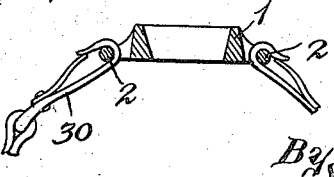

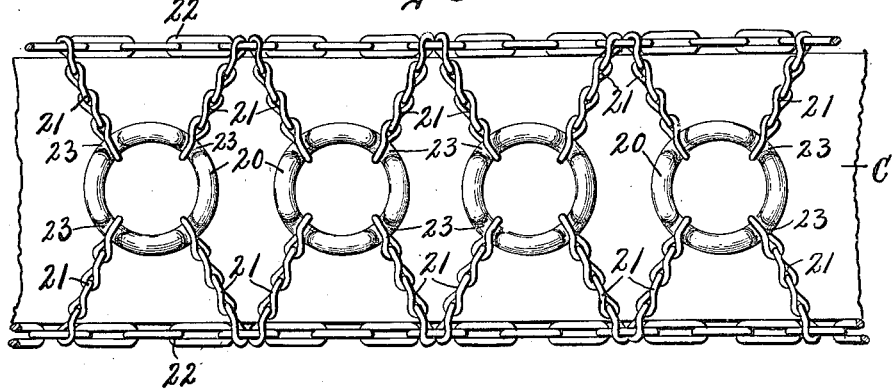

UNITED STATES PATENT OFFICE.

HARRY D. WEED, OF CANASTOTA, NEW YORK, ASSIGNOR TO WALTER B. LASHAR, OF BRIDGEPORT, CONNECTICUT.

GRIP-TREAD FOR VEHICLE-TIRES.

1,141,735.

Specification of Letters Patent.

Patented June 1, 1915.

Application filed March 13, 1906. Serial No. 305,754.

*To all whom it may concern:*

Be it known that I, HARRY D. WEED, of Canastota, in the county of Madison, in the State of New York, have invented new and useful Improvements in Grip-Treads for Vehicle-Tires, of which the following, taken in connection with the accompanying drawings, is a full, clear, and exact description.

This invention relates to certain improvements in grip treads for vehicle tires of the class set forth in my pending application No. 346,510.

The essential purpose of my present invention is to loosely apply a circumferential series of wearing plates or elements to the periphery or tread of the tire in such manner that they will have a free and independent circumferential and rocking movement around and upon the tire.

Another object is to bring the points of attachment of the attaching elements within the tread or wearing faces of the plate.

Other objects and uses will appear in the following description.

In the drawings, Figure 1 is a side elevation of a portion, of a pneumatic vehicle tire and a series of one form of tread plates and their attaching elements whereby they are held upon the periphery of the tire. Figs. 2 and 3 are respectively a transverse sectional view and a top plan view of the parts seen in Fig. 1. Figs. 4, 5 and 6 are respectively top plan, side elevation, and transverse sectional views of a portion of a vehicle tire and a still further modified form of the gripping elements and attaching means therefor. Fig. 7 is a perspective view of one of the detached gripping elements. Fig. 8 is a plan of a further modified form of grip tread. Fig. 9 is a perspective view of one of the gripping elements seen in Fig. 10. Fig. 10 is a sectional view of a wearing plate similar to that seen in Figs. 1, 2 and 3 showing attaching elements detachably connected thereto.

The grip tread or armor hereinbefore referred to comprises the entire circular series of wearing plates and their attaching elements and will be considered as being continuous or co-extensive with the tread of the tire. But in order to avoid unnecessary drawing and also for the purpose of more clearly defining the invention I have shown only portions of a tire and corresponding portions of the grip tread.

In Figs. 1, 2 and 3, this grip tread preferably consists of a circular series of separate wearing elements —1— arranged side by side circumferentially around the tire and having substantially flat inner faces resting upon the tread of the tire and tangentially to the transverse curvature of said tread, as best seen in Fig. 2.

The sides or transverse ends of each wearing element —1— preferably extend some distance beyond the point of contact with the tread of the tire and are formed with suitable bearings —2— which are depressed some distance within the plane of the wearing surface for receiving suitable attaching elements, as in this instance flat links —3—, which are connected to opposite circular side pieces —4—, one at each side of the tire for holding the wearing elements centrally upon the periphery of the tire, as A.

The attaching elements —3— are wholly within the plane of outer faces or wearing surfaces of the tread elements —1— and are flexibly connected to the bearings —2— and side pieces —4— to enable the tread elements —1— to conform to the depression of the tread of the tire caused by the superimposed load or obstructions which the wheel may encounter while traveling along the pavement.

By making the inner faces of the wearing elements —1— flat and tangential to the transverse curvature of the tire said wearing elements have a free transverse rocking or flexing action with their attaching elements and the points of contact with the tire being comparatively small and the entire grip tread being free to move transversely and circumferentially upon the tire, it is obvious that the frictional wear is distributed around the entire periphery of the tire and is not confined to any particular point or points, as would be the case if the plates were secured to the tire or rim of the wheel.

The particular features of the advantage of my improved grip tread are, first, that the attaching points of the attaching elements are removed some distance within the wearing surfaces of the tread elements; second, that the contacting surfaces between said elements and periphery of the tire is reduced to a minimum; third, that these elements have a free transverse rocking or flexing action on the periphery of the tire;

and fourth, that the entire grip tread has a unitary structure, is free to creep or move circumferentially around the tire thereby more evenly distributing the wear so as not to confine it at any particular point or points in the tire.

Each of the wearing elements —1— is shown as provided with a central opening —2'— and with opposite side slots —3'— through which the links —3— are inserted and attached to the bearings —2—.

All of the elements of the grip tread are made of suitable metal adapted to withstand the strain and wear to which they are subjected, the wearing elements —1— being preferably made of cast metal, such as malleable iron or equivalent tenacious metal and are adapted to be replaced when impaired by wear or other cause, without sacrificing the attaching elements or side pieces.

In Figs. 4, 5 and 6 I have shown a series of tread elements, as rings —15—, arranged circumferentially around and upon the periphery of the tire —B—, shown by dotted lines in Fig. 6, and connected by attaching elements —16— to hooks —17— on the rim, as —18—, of the wheel. In this instance the wearing elements —15— and their attaching elements —16— form one continuous flexible chain or cable which is laced or drawn across the periphery of the tire and detachably looped or engaged at intervals with the hooks —17— which are secured in staggered relation to the rim —18—.

As in Figs. 1 to 3 inclusive the attaching elements —16— are flexibly connected to depressed bearings —19— on the sides of the wearing elements —15— within the plane of the wearing surface to avoid contact of the attaching elements with the pavement, thereby preserving their integrity and bringing the wear entirely upon the tread plates or rings —15— which are made of suitable metal to withstand the strain and wear to which they are subjected and when impaired may be replaced by new ones without sacrificing the attaching elements, as —16—. In equipping the tire with this last described grip tread one end of the continuous chain or cable constituting the wearing links and attaching elements is hooked into one of the hooks —17— and the chain or cable is then drawn diagonally back and forth across the tread of the tire and attached at intervals to the remaining staggered hooks —17— until the other end is returned to and hooked upon the first named hook or that next adjacent to it.

In Fig. 8 I have shown a circular series of gripping elements, as rings —20—, arranged one in advance of the other around and upon the periphery of the tire, as —C—, and each connected by a series of, in this instance four, attaching elements —21— to circular side pieces, as chains —22—.

As in the previously described gripping elements the rings —20— are provided with depressed bearings —23— to which the attaching members —21— are flexibly connected so as to lie within the wearing surfaces of the members —20— and thereby avoid direct contact with the pavement, the adjacent attaching elements of the contiguous wearing rings being preferably connected at substantially the same point to the circular side pieces —22—.

Many other modifications of the wearing elements and attaching elements might be disclosed, having the common advantage of connecting the attaching elements to the wearing elements within the wearing surfaces of the latter so as to bring the wear entirely upon the wearing elements and not upon the attaching devices.

In Fig. 10 I have shown a wearing plate —1— as provided with depressed bearings —2— for receiving detachable attaching devices, such as snap hooks —30—, which may be readily disconnected from the wearing plate —1— to permit the latter to be removed when worn or otherwise impaired. Reference is hereby made to my pending application #241,646 filed Jan. 18, 1905; #287,868, filed Nov. 17, 1905; #312,041 filed April 16, 1906; #402,778, filed Nov. 19, 1907 and #423,323, filed March 26, 1908.

What I claim is,—

1. A grip-tread for the tires of wheels comprising longitudinal retaining members, sections of cross-chains having their ends connected with said retaining members, and tread-rings, said rings having alternately disposed large and reduced portions, said reduced portions providing annular receiving spaces in which the end-links of said cross-chains are arranged and connected with said reduced portions.

2. A grip tread for the tires of wheels comprising tread rings having alternately disposed large and reduced portions, and attaching members connected to said reduced portions.

3. A grip tread for resilient wheel tires comprising tread members presenting closed open-centered outlines to the tire and having alternately disposed projecting wearing portions and depressed attaching portions and attaching members connected to said depressed attaching portions.

4. A tread grip for resilient wheel tires comprising tread members presenting closed open-centered outlines to the tire and having projecting wearing portions to engage the roadway and depressed attaching portions and attaching members connected to said depressed attaching portions.

5. A chain mat for resilient tires comprising side chains, tread pieces presenting closed open-centered outlines to the tire, and securing chains for each tread piece secured to either side chain at remote points and to each tread piece at fixed locations.

6. A chain mat for resilient tires comprising side chains, ring-shaped tread pieces having opposite portions thereof reduced to provide two pairs of anchor seats, the members of each pair of seats being arranged in spaced relation, and securing chains having one of their ends fixed to said seats to prevent movement on the tread pieces and their other ends connected to the side chains at remote locations.

7. A chain mat for resilient tires comprising side chains, tread pieces presenting closed open-centered outlines to the tire, and securing chains formed of flat links for each tread piece secured to either side chain at remote points and to each tread piece at fixed locations.

8. A chain grip for resilient tires comprising side chains, ring shaped tread pieces each having opposite portions thereof reduced to provide two pairs of anchor seats, the members of each pair of seats being arranged in spaced relation, and securing chains for each tread piece having one of their ends fixed to said seats to prevent movement on the tread piece and having their other ends connected to the side chains at remote locations.

9. A chain grip for resilient tires comprising side chains, ring shaped tread pieces having opposite portions thereof reduced to provide two pairs of anchor seats, the members of each pair of seats being arranged in spaced relation, and securing chains having one of their ends fixed to said seats to prevent movement on the tread pieces and having their other ends connected to the side chains.

In witness whereof I have hereunto set my hand on this 10th day of March 1906.

HARRY D. WEED.

Witnesses:
H. E. CHASE,
HOWARD P. DENISON.